US008920937B2

United States Patent
Litton et al.

(10) Patent No.: US 8,920,937 B2
(45) Date of Patent: Dec. 30, 2014

(54) ZIRCONIUM MODIFIED PROTECTIVE COATING

(75) Inventors: David A. Litton, Rocky Hill, CT (US); Venkatarama K. Seetharaman, Rocky Hill, CT (US); Michael J. Maloney, Marlborough, CT (US); Benjamin J. Zimmerman, Enfield, CT (US); Brian S. Tryon, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 2060 days.

(21) Appl. No.: 11/834,001

(22) Filed: Aug. 5, 2007

(65) Prior Publication Data
US 2009/0035601 A1 Feb. 5, 2009

(51) Int. Cl.
*B32B 15/01* (2006.01)
*C09D 1/00* (2006.01)
*C09D 5/08* (2006.01)
*C22C 19/05* (2006.01)
*C23C 30/00* (2006.01)
*C23C 28/00* (2006.01)

(52) U.S. Cl.
CPC . *B32B 15/01* (2013.01); *C09D 1/00* (2013.01); *C09D 5/084* (2013.01); *C22C 19/05* (2013.01); *C23C 30/00* (2013.01); *C23C 28/321* (2013.01); *C23C 28/3455* (2013.01); *Y02T 50/67* (2013.01)
USPC ........ 428/680; 428/637; 106/286.3; 420/445; 420/455; 420/456; 420/468; 427/531; 427/580; 427/248.1; 148/429; 148/428; 416/241 R

(58) Field of Classification Search
None
See application file for complete search history.

(56) References Cited

U.S. PATENT DOCUMENTS

| | | | | |
|---|---|---|---|---|
| 3,918,139 A * | 11/1975 | Felten | ........................... | 428/655 |
| 4,313,760 A * | 2/1982 | Dardi et al. | .................. | 106/1.12 |
| 4,346,137 A * | 8/1982 | Hecht | ........................... | 428/215 |
| 4,615,864 A * | 10/1986 | Dardi et al. | .................... | 420/437 |
| 4,719,080 A * | 1/1988 | Duhl et al. | ..................... | 420/443 |
| 4,758,480 A | 7/1988 | Hecht | | |
| 5,687,679 A | 11/1997 | Mullin | | |
| 5,942,337 A * | 8/1999 | Rickerby et al. | .............. | 428/623 |
| 6,066,405 A * | 5/2000 | Schaeffer | ....................... | 428/547 |
| 6,123,997 A | 9/2000 | Schaeffer | | |
| 6,153,313 A | 11/2000 | Rigney | | |
| 6,255,001 B1 | 7/2001 | Darolia | | |
| 6,291,084 B1 | 9/2001 | Darolia | | |
| 6,340,500 B1 | 1/2002 | Spitsberg | | |
| 6,435,826 B1 | 8/2002 | Allen | | |
| 6,435,835 B1 | 8/2002 | Allen | | |
| 6,458,473 B1 | 10/2002 | Conner | | |
| 6,471,791 B1 * | 10/2002 | Nazmy et al. | .................. | 148/429 |
| 6,475,642 B1 | 11/2002 | Zhao | | |
| 6,682,827 B2 | 1/2004 | Darolia | | |
| 6,706,241 B1 * | 3/2004 | Baumann et al. | .............. | 420/448 |
| 7,273,662 B2 * | 9/2007 | Gleeson et al. | ............... | 428/680 |
| 7,326,441 B2 * | 2/2008 | Darolia et al. | ................. | 427/328 |
| 2002/0187336 A1 * | 12/2002 | Khan et al. | ..................... | 428/323 |
| 2007/0071996 A1 * | 3/2007 | Hazel et al. | .................... | 428/650 |

* cited by examiner

*Primary Examiner* — Mark Ruthkosky
*Assistant Examiner* — Daniel J Schleis
(74) *Attorney, Agent, or Firm* — Carlson, Gaskey & Olds, P.C.

(57) ABSTRACT

A protective coating system includes a nickel-aluminum-zirconium alloy coating having beta phase nickel-aluminum and at least one phase selected from gamma phase nickel and the gamma prime phase nickel-aluminum. The nickel-aluminum-zirconium alloy coating comprises 10 vol % to 60 vol % of the beta phase nickel-aluminum or 25 vol % to 75 vol % of the beta phase nickel-aluminum.

14 Claims, 2 Drawing Sheets

ZIRCONIUM MODIFIED PROTECTIVE COATING

The government may have certain rights in this invention pursuant to Contract No. F33615-03-C-5231 awarded by the United States Air Force.

BACKGROUND OF THE INVENTION

This invention relates to protective coatings and, more particularly, to protective coatings that include zirconium for enhanced oxidation resistance.

Components that are exposed to high temperatures, such as gas turbine engine components, typically include a protective coating system having one or more coating layers. For example, turbine blades, turbine vanes, and blade outer air seals typically include the coating system to protect from erosion, oxidation, corrosion or the like and thereby enhance durability or maintain efficient operation of the engine.

Typically, the coating system includes a metallic coating, such as a MCrAlY coating, as a "stand-alone" coating or as a bond coat for a ceramic topcoat. The metallic coating reacts with oxygen to form an adherent oxide that protects the underlying component from oxidation and corrosion. To control a rate of oxidation of the aluminum in the coating, reactive elements such as hafnium have been added to the coating composition. One drawback of using hafnium is that it may diffuse and react with elements within the component to form intermetallic phases that degrade the mechanical integrity of the components or reduce the oxidation resistance of the coating.

Accordingly, there is a need for a protective coating that is more compatible with the underlying component and a method of manufacturing the protective coating. This invention addresses those needs while avoiding the shortcomings and drawbacks of the prior art.

SUMMARY OF THE INVENTION

An example protective coating system includes a nickel-aluminum-zirconium alloy coating having beta phase nickel-aluminum and at least one phase selected from gamma phase nickel and gamma prime phase nickel-aluminum, and the nickel-aluminum-zirconium alloy coating comprises 10 vol % to 60 vol % of the beta phase nickel-aluminum or 25 vol % to 75 vol % of the beta phase nickel-aluminum. The nickel-aluminum-zirconium alloy coating may include about 0.001 wt % to 0.2 wt % zirconium and be disposed on a nickel alloy substrate.

An example method of manufacturing a protective coating system includes forming a protective coating of a nickel-aluminum-zirconium alloy having beta phase nickel-aluminum and at least one phase selected from gamma phase nickel and gamma prime phase nickel-aluminum. The nickel-aluminum-zirconium alloy comprises 10 vol % to 60 vol % of the beta phase nickel-aluminum or 25 vol % to 75 vol % of the beta phase nickel-aluminum.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
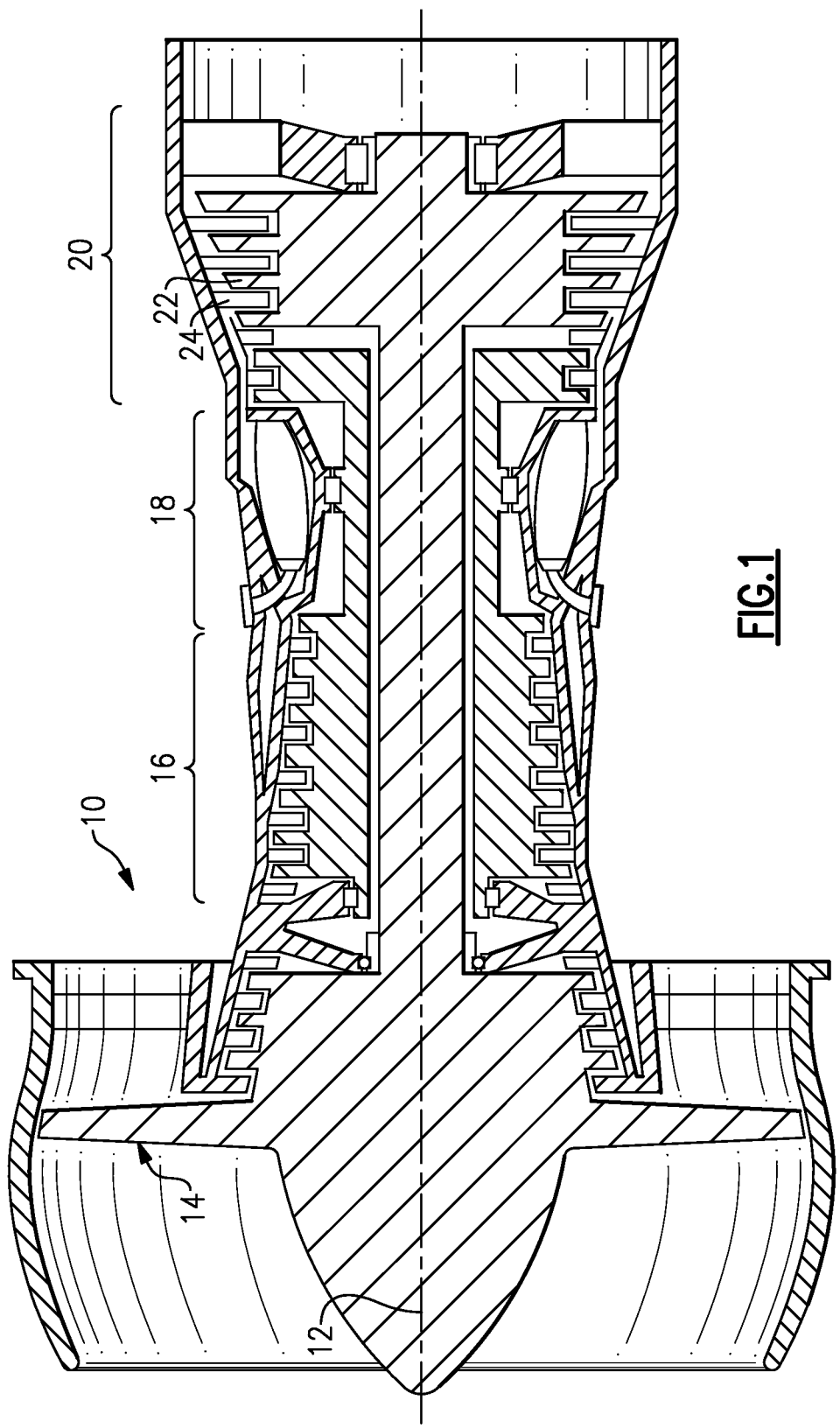
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 includes a fan 14, a compressor section 16, a combustion section 18 and a turbine section 20 that includes turbine blades 22 and turbine vanes 24. As is known, air compressed in the compressor section 16 is mixed with fuel and burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2:
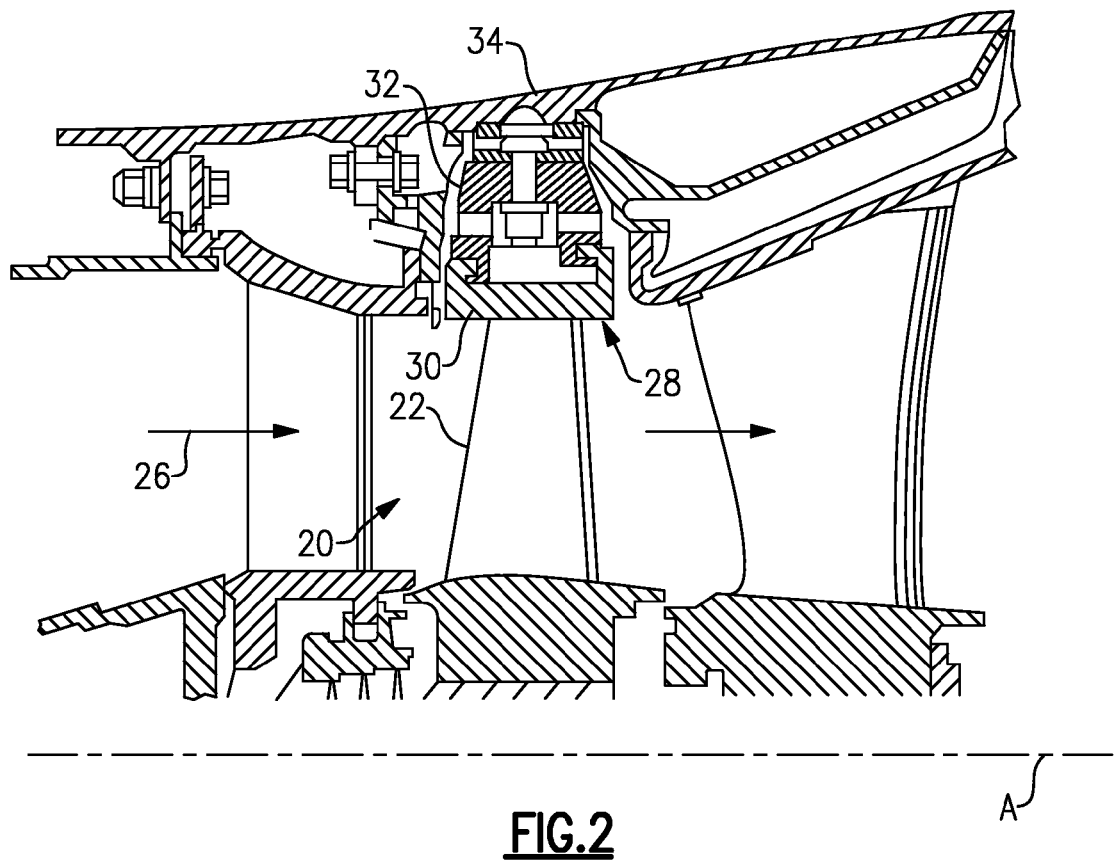
FIG. 2 illustrates a turbine section of the gas turbine engine.

FIG. 2 illustrates selected portions of the turbine section 20. The turbine blade 22 receives a hot gas flow 26 from the combustion section 18 (FIG. 1). The turbine section 20 includes a blade outer air seal system 28 having a seal member 30 that functions as an outer wall for the hot gas flow 26 through the turbine section 20. The seal member 30 is secured to a support 32, which is in turn secured to a case 34 that generally surrounds the turbine section 20. For example, a plurality of the seal members 30 may be circumferentially located about the turbine section 20.

Figure 3:
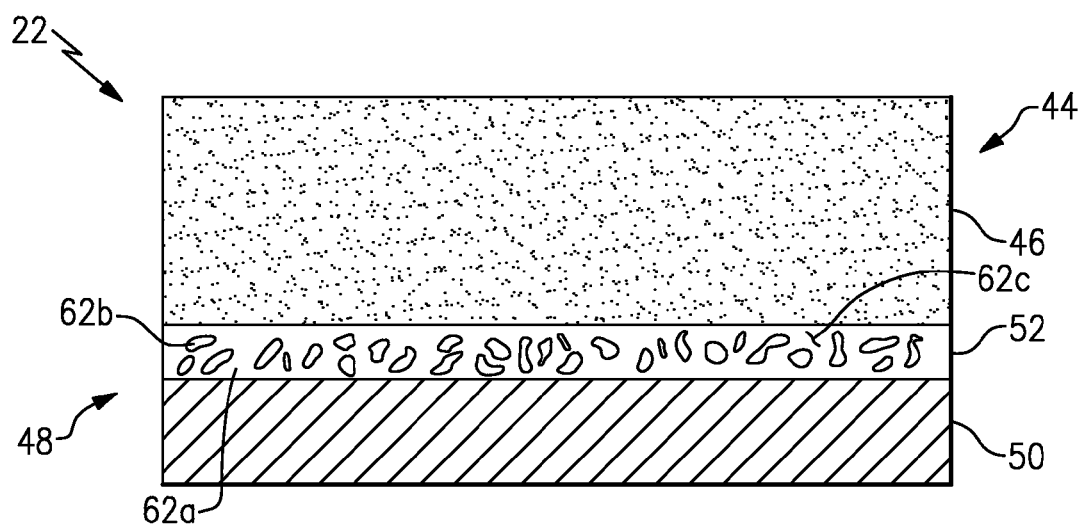
FIG. 3 illustrates a portion of a turbine blade within the turbine section.

FIG. 3 illustrates an example portion 44 of the turbine blade 22. In this example, the turbine blade 22 includes a substrate 46 having a protective system 48 disposed thereon. The protective system 48 includes an optional abradable ceramic member 50, such as a ceramic topcoat, and a nickel-aluminum-zirconium alloy coating 52 between the ceramic member 50 and the substrate 46. The nickel-aluminum-zirconium alloy coating 52 may be formed as an original coating before the turbine blade 22 is used in the engine 10, or as a repair coating to replace a removed portion of another coating after use of the turbine blade 22 in the engine 10. Although a particular protective system 48 is shown, it is to be understood that the disclosed examples are not limited to the illustrated configuration and may include additional layers. Furthermore, although the turbine blade 22 is shown, it is to be understood that the disclosed examples may also be applied to other types of engine or non-engine components, such as, but not limited to, the turbine vanes 24 and seal members 30. Additionally, it is to be understood that the nickel-aluminum-zirconium alloy coating 52 may be used as a "stand alone" protective coating or as a bond coat for attaching other layers to the substrate 46.

In one example, the ceramic member 50 comprises yttria stabilized zirconia, gadolinia stabilized zirconia, hafnia, zirconia, gadolinia, mullite, alumina, or combinations thereof. For example, the ceramic member 50 may be formed or deposited on the nickel-aluminum-zirconium alloy coating 52 using a thermal spray process.

The nickel-aluminum-zirconium alloy coating 52 includes zirconium to reduce the oxidation rate of the nickel-aluminum-zirconium alloy coating 52. For example, the zirconium limits the oxidation rate of aluminum within the coating 52. Limiting oxidation provides the benefit of promoting the formation of a dense and adherent alumina scale that limits oxygen transport to the underlying substrate 46 to thereby reduce the rate of oxidation of the substrate 46.

The nickel-aluminum-zirconium alloy coating 52 comprises about 0.001 wt % to 0.2 wt % of the zirconium. In a further example, the coating 52 comprises about 0.001 wt % to 0.1 wt % of the zirconium. The zirconium is thought to reside in solid solution and may segregate to microstructural grain boundaries of the coating 52. However, if the amount of zirconium exceeds the 0.2 wt % limit, a portion of the zirconium may separate out of solid solution as an intermetallic zirconium phase and become less effective for controlling oxidation.

The nickel-aluminum-zirconium alloy coating 52 further includes a composition having a relatively low amount of aluminum. The relatively low amount of aluminum results in the formation of phases 62a and 62b of nickel and/or nickel-aluminum, which may be alloyed with other elements in the composition of the coating 52. For example, a relatively low amount of aluminum results in phases 62a and 62b that include gamma phase nickel, gamma prime phase nickel-aluminum, or a beta phase nickel-aluminum in combination with the gamma phase nickel or the gamma prime phase nickel-aluminum. It is to be understood that gamma phase nickel is Ni, gamma prime phase nickel-aluminum is Ni$_3$Al, and beta phase nickel-aluminum is NiAl. Thus, depending upon the amount of aluminum and nickel in the coating 52, various combinations and amounts of the phases 62a and 62b may be formed (e.g., during solidification from a liquid or vapor state).

The composition of the nickel-aluminum-zirconium alloy coating 52 may additionally include other elements. In one example, the nickel-aluminum-zirconium alloy coating 52 includes about 2 wt % to 14 wt % aluminum, about 6 wt % to 20 wt % cobalt, about 4 wt % to 20 wt % chromium, up to 2 wt % hafnium, up to 2 wt % molybdenum, up to 2 wt % rhenium, up to 1 wt % silicon, up to 10 wt % tungsten, up to 10 wt % tantalum, up to 2 wt % yttrium, up to 60 wt % platinum, and a balance of nickel in combination with the above-described amount of zirconium. The term "about" as used in this description relative to compositions refers to possible variation in the compositional percentages, such as normally accepted variations or tolerances in the art.

In a further example, the composition of a nickel-aluminum-zirconium alloy coating 52 includes 4 wt % to 8 wt % aluminum, 10 wt % to 14 wt % cobalt, 8 wt % to 12 wt % chromium, up to 1 wt % hafnium, up to 2 wt % molybdenum, up to 2 wt % rhenium, up to 1 wt % silicon, 3 wt % to 6 wt % tungsten, 3 wt % to 6 wt % tantalum, up to 1 wt % yttrium, up to 60 wt % platinum, and a balance of nickel with the above-described amount of zirconium.

Depending upon the selected amount of aluminum in the above described compositions, the nickel-aluminum-zirconium alloy coating 52 may include different amounts of the phases 62a and 62b. In one example, the phase 62a is gamma phase and comprises at least 95 vol % of the coating 52, and the phase 62b is gamma prime phase and comprises about 0.1 vol % to 5 vol % of the coating 52. In another example, the phase 62a is gamma phase and comprises 70 vol % to 95 vol % of the coating 52, and the phase 62b is gamma prime phase and comprises 5 vol % to 30 vol % of the coating 52. In another example, the phase 62a is gamma phase and comprises 25 vol % to 75 vol % of the coating 52, and the phase 62b is beta phase and comprises 25 vol % to 75 vol % of the coating 52. In another example, the nickel-aluminum-zirconium alloy coating 52 includes the phases 62a and 62b along with a third phase 62c dispersed through the coating 52. For example, the phase 62a is gamma phase and comprises 10 vol % to 30 vol % of the coating 52, the phase 62b is gamma prime phase and comprises 10 vol % to 60 vol % of the coating 52, and the phase 62c is beta phase and comprises 10 vol % to 60 vol % of the coating 52 where the phases 62a, 62b, and 62c total 100 vol %. Given this description, one of ordinary skill in the art will be able to estimate or determine without undue experimentation the amounts of aluminum within the disclosed ranges that produce the above volumes of the phases 62a, 62b, or 62c. Selecting an amount of aluminum above about 14 wt % may result in a volume of beta phase that is greater than 30 vol %, which may undesirably lead to increased coating oxidation rates.

The nickel-aluminum-zirconium alloy coating 52 may be formed using any of a variety of different manufacturing processes. For example, the nickel-aluminum-zirconium alloy coating 52 is formed using thermal spraying, high velocity oxygen fuel deposition, directed vapor deposition, cathodic arc deposition, or physical vapor deposition. One or more of these processes may use a source raw material, such as a powder, comprising the above-described compositions or compositions intended to produce the coating 52 with the above-described compositions. Alternatively, the zirconium may be implanted into a pre-existing coating using a technique such as ion implantation. For example, a coating composition as described above, but without the zirconium, would be formed and later implanted with the zirconium.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A protective coating system comprising:
a nickel-aluminum-zirconium alloy coating having beta phase nickel-aluminum and at least one phase selected from gamma phase nickel and gamma prime phase nickel-aluminum, wherein the nickel-aluminum-zirconium alloy coating comprises 25 vol % to 75 vol % of the beta phase nickel-aluminum.

2. The protective coating system as recited in claim 1, wherein the nickel-aluminum-zirconium alloy coating comprises about 0.001 wt % to 0.2 wt % zirconium.

3. The protective coating system as recited in claim 2, wherein the nickel-aluminum-zirconium alloy coating comprises about 0.001 wt % to 0.1 wt % of the zirconium.

4. The protective coating system as recited in claim 2, wherein the nickel-aluminum-zirconium alloy coating comprises about 2 wt % to 14 wt % aluminum, about 6 wt % to 20 wt % cobalt, about 4 wt % to 20 wt % chromium, up to 2 wt % hafnium, up to 2 wt % molybdenum, up to 2 wt % rhenium, up to 1 wt % silicon, up to 10 wt % tungsten, up to 10 wt % tantalum, up to 2 wt % yttrium, up to 60 wt % platinum, and a balance of nickel.

5. The protective coating system as recited in claim 2, wherein the nickel-aluminum-zirconium alloy coating comprises about 4 wt % to 8 wt % aluminum, about 10 wt % to 14 wt % cobalt, about 8 wt % to 12 wt % chromium, up to 1 wt % hafnium, up to 2 wt % molybdenum, up to 2 wt % rhenium, up to 1 wt % silicon, about 3 wt % to 6 wt % tungsten, about 3 wt % to 6 wt % tantalum, up to 1 wt % yttrium, up to 60 wt % platinum, and a balance of nickel.

6. The protective coating system as recited in claim 1, further comprising a nickel alloy substrate attached to the nickel-aluminum-zirconium alloy coating.

7. The protective coating system as recited in claim 6, wherein the nickel alloy substrate comprises a refractory element selected from rhenium and ruthenium.

8. The protective coating system as recited in claim 6, further comprising a ceramic thermal barrier coating disposed on the nickel-aluminum-zirconium alloy coating.

9. A protective coating system comprising:
   a nickel alloy substrate; and
   a nickel-aluminum-zirconium alloy coating disposed on the nickel alloy substrate and having beta phase nickel-aluminum and at least one phase selected from gamma phase nickel and gamma prime phase nickel-aluminum, wherein the nickel-aluminum alloy comprises about 0.001 wt % to 0.2 wt % zirconium and 25 vol % to 75 vol % of the beta phase nickel-aluminum.

10. The protective coating system as recited in claim 9, wherein the nickel-aluminum-zirconium alloy coating comprises between about 0.001 wt % and 0.1 wt % of the zirconium.

11. The protective coating system as recited in claim 9, wherein the nickel-aluminum-zirconium alloy coating comprises about 2 wt % to 14 wt % aluminum, about 6 wt % to 20 wt % cobalt, about 4 wt % to 20 wt % chromium, up to 2 wt % hafnium, up to 2 wt % molybdenum, up to 2 wt % rhenium, up to 1 wt % silicon, up to 10 wt % tungsten, up to 10 wt % tantalum, up to 2 wt % yttrium, up to 60 wt % platinum, and a balance of nickel.

12. The protective coating system as recited in claim 9, wherein the nickel-aluminum-zirconium alloy coating comprises about 4 wt % to 8 wt % aluminum, about 10 wt % to 14 wt % cobalt, about 8 wt % to 12 wt % chromium, up to 1 wt % hafnium, up to 2 wt % molybdenum, up to 2 wt % rhenium, up to 1 wt % silicon, about 3 wt % to 6 wt % tungsten, about 3 wt % to 6 wt % tantalum, up to 1 wt % yttrium, up to 60 wt % platinum, and a balance of nickel.

13. A method of manufacturing a protective coating system, comprising:
   forming a protective coating of a nickel-aluminum-zirconium alloy having beta phase nickel-aluminum and at least one phase selected from gamma phase nickel and gamma prime phase nickel-aluminum, and the nickel-aluminum-zirconium alloy comprises 25 vol % to 75 vol % of the beta phase nickel-aluminum.

14. The method as recited in claim 13, further comprising forming the protective coating using at least one of thermal spraying, high velocity oxygen fuel deposition, directed vapor deposition, cathodic arc deposition, physical vapor deposition, or ion implantation.

* * * * *